(12) United States Patent
Winter et al.

(10) Patent No.: US 7,655,213 B2
(45) Date of Patent: Feb. 2, 2010

(54) DIRECT OXIDATION OF SULFUR WITH CARBON DIOXIDE RECYCLE

(75) Inventors: John Duckett Winter, Broomfield, CO (US); Raymond D. Steele, Cypress, TX (US)

(73) Assignee: General Electric Company, Schnectady, NY (US)

( * ) Notice: Subject to any disclaimer, the term of this patent is extended or adjusted under 35 U.S.C. 154(b) by 0 days.

(21) Appl. No.: 12/153,058

(22) Filed: May 13, 2008

(65) Prior Publication Data
US 2009/0285738 A1 Nov. 19, 2009

(51) Int. Cl.
*C01B 17/04* (2006.01)
(52) U.S. Cl. ............... 423/573.1; 423/576.2; 423/576.8
(58) Field of Classification Search ............... 423/573.1, 423/576.2, 576.8
See application file for complete search history.

(56) References Cited

U.S. PATENT DOCUMENTS 3,681,024 A * 8/1972 Hujsak et al. ............... 423/575

| 4,552,572 A | 11/1985 | Galstaun |
| 6,072,097 A | 6/2000 | Yokoyama et al. |
| 6,214,311 B1 | 4/2001 | Kwong |
| 6,403,051 B1 | 6/2002 | Keller |
| 6,652,827 B1 | 11/2003 | Borsboom et al. |
| 6,890,962 B1 | 5/2005 | O'Rear et al. |
| 6,962,683 B2 | 11/2005 | Gangwal et al. |
| 6,992,114 B2 | 1/2006 | O'Rear et al. |

* cited by examiner

*Primary Examiner*—Timothy C Vanoy
(74) *Attorney, Agent, or Firm*—Nixon & Vanderhye P.C.

(57) ABSTRACT

A method for removing hydrogen sulfide to produce elemental sulfur from a synthesis gas feed stream containing hydrogen sulfide, carbon monoxide, hydrogen, carbon dioxide and water using direct oxidation of hydrogen sulfide by contacting a feed stream containing synthesis gas with oxygen in the presence of a catalyst comprised of metal oxides to convert a substantial fraction of the hydrogen sulfide present in the feed stream into sulfur and water, followed by cooling the reaction products to a temperature below the dew point temperature of the water and sulfur, separating the reaction products into two streams, with the first stream containing elemental sulfur and water in liquid form and the second stream containing unreacted components from the synthesis gas, hydrogen sulfide, carbon monoxide, hydrogen, carbon dioxide and water, and then recycling a portion of the unreacted components to the feed stream.

13 Claims, 5 Drawing Sheets

DIRECT OXIDATION OF SULFUR WITH CARBON DIOXIDE RECYCLE

BACKGROUND OF THE INVENTION

In recent years, the generation of electric power using fossil fuels, particularly hydrocarbon fuel gases produced from coal gasification processes, has received careful scrutiny because of the potential adverse impact on the environment of atmospheric emissions containing sulfur compounds such as hydrogen sulfide. In the past, some processes for treating fossil fuels prior to combustion and/or gasification have achieved limited success in minimizing unwanted emissions. In addition, a number of post-combustion treatments of the gases (typically relying on complex solvent or other sorbent removal techniques to remove sulfur compounds) have proven technically feasible, although often not economical.

The use of high-sulfur content coal presents significant pollution concerns because the gasification process produces a raw fuel gas comprised of carbon monoxide, hydrogen, and lesser quantities of carbon dioxide ($CO_2$), methane and gaseous sulfur compounds, principally hydrogen sulfide ($H_2S$) and carbonyl sulfide (COS). Small amounts of ammonia, elemental nitrogen, hydrogen chloride and hydrogen cyanide may also be present. From an environmental standpoint, it is important to remove such components from any emissions, particularly the sulfur compounds.

Many industries, such as refining and petrochemical plants, often generate waste streams that contain unconverted hydrocarbons, free hydrogen, sulfide, carbon oxides and inert gases. Such waste streams typically occur at the end of refining operations and have been used as residual fuel for other processes within the same refinery complex. Higher processing efficiencies can be realized if waste streams containing unconverted hydrocarbons (including olefin compounds) and hydrogen are economically converted to higher value hydrocarbon products for use as fuel or chemical feedstock, provided that waste components such as hydrogen sulfide are first removed.

Thus, processes capable of efficiently removing and then reusing waste streams containing sulfur compounds have become of considerable interest in the petrochemical, power generation and oil and gas refining industries. Environmental concerns over waste streams have also resulted in an increased interest in removing hydrogen sulfide and/or recovering elemental sulfur without adversely affecting the efficiency of an overall commercial process.

One known process for treating gas streams containing hydrocarbons and sulfur waste components relies on the catalytic conversion of hydrocarbon constituents to hydrogen and carbon monoxide. Examples of such processes include catalytic steam reforming, catalytic partial oxidation, and catalytic autothermal reforming and non-catalytic partial oxidation. These known processes (often referred to as "synthesis gas" or "SynGas" processes) produce various ratios of hydrogen and carbon monoxide and can contain sulfur contaminants.

Heretofore, the treatment of synthesis gas containing hydrogen sulfide and carbon dioxide using direct oxidation of $H_2S$ has not been accomplished in a commercially efficient or economical manner. In the known modified Claus process, following the removal from the synthesis gas, a portion of the hydrogen sulfide is combusted with air or oxygen to form sulfur dioxide. The uncombusted hydrogen sulfide is then reacted with the sulfur dioxide to form elemental sulfur and water.

The following patents relate to the desulfurization of fuel gas. U.S. Pat. No. 4,552,572, issued to Bechtel International, describes a method and apparatus for removing acid gases from a first gas stream rich in carbon dioxide and for desulfurizing a second gas stream lean in carbon dioxide but containing sulfur compounds as impurities. The '572 process requires contacting the first gas with a solvent capable of extracting carbon dioxide and sulfur compounds from the first stream and thereafter separating the carbon dioxide and sulfur.

U.S. Pat. No. 3,824,766 describes an adiabatic process for purifying hydrocarbon gases containing $CO_2$ and sulfur compounds as impurities. A $CO_2$-laden solvent is used to extract sulfur from the impure gas stream. After removal of the sulfur compounds, the partly purified gas stream passes to an expansion turbine where work is produced by the resulting gas stream. The residual $CO_2$ is eventually removed using solvent extraction.

U.S. Pat. No. 4,332,598 uses a $CO_2$-laden physical solvent to extract the bulk of sulfur compounds from an impure gas. The partially purified gas is then contacted with a fully regenerated solvent to extract the $CO_2$ along with the remaining sulfur compounds, mostly comprising COS. The $CO_2$ is eventually removed from the system using downstream stripping and solvent extraction techniques.

BRIEF DESCRIPTION OF THE INVENTION

The present invention relates to a method and system for removing hydrogen sulfide to produce elemental sulfur and water from a synthesis gas feed stream containing hydrogen sulfide and carbon dioxide. In one exemplary embodiment, the method comprises the steps of (1) contacting the synthesis gas feed stream with oxygen in the presence of a catalyst to convert a portion of the hydrogen sulfide into elemental sulfur and water; (2) cooling the initial reaction products to a temperature below the dew point temperature of the elemental sulfur; (3) separating the initial reaction products into a first stream containing elemental sulfur and water, and a second stream containing carbon dioxide and unreacted components in the synthesis gas; and (4) recycling a portion of the unreacted components and carbon dioxide back to the synthesis gas feed stream.

Nominally, the synthesis gas feed stream comprises hydrogen sulfide, carbon monoxide, hydrogen, carbon dioxide, water and carbonyl sulfide and the second stream includes unreacted hydrogen sulfide, carbon monoxide, free hydrogen, carbon dioxide and water. As described herein, the step of contacting the synthesis gas feed stream with oxygen in the presence of the catalyst forms elemental sulfur and water without significant reduction in free hydrogen and carbon monoxide present in the initial feed stream. Typically, the oxygen will be added to the synthesis gas feed stream in a first reaction vessel during contact of the feed stream with the catalyst. Exemplary catalysts useful in the method and system according to the invention include but are not limited to Ni and Ti, together with catalyst promoters selected from the oxides of V, Cr, Mn, Fe, Co, Ni, Cu and Mo.

DETAILED DESCRIPTION OF THE INVENTION

Figure 1:
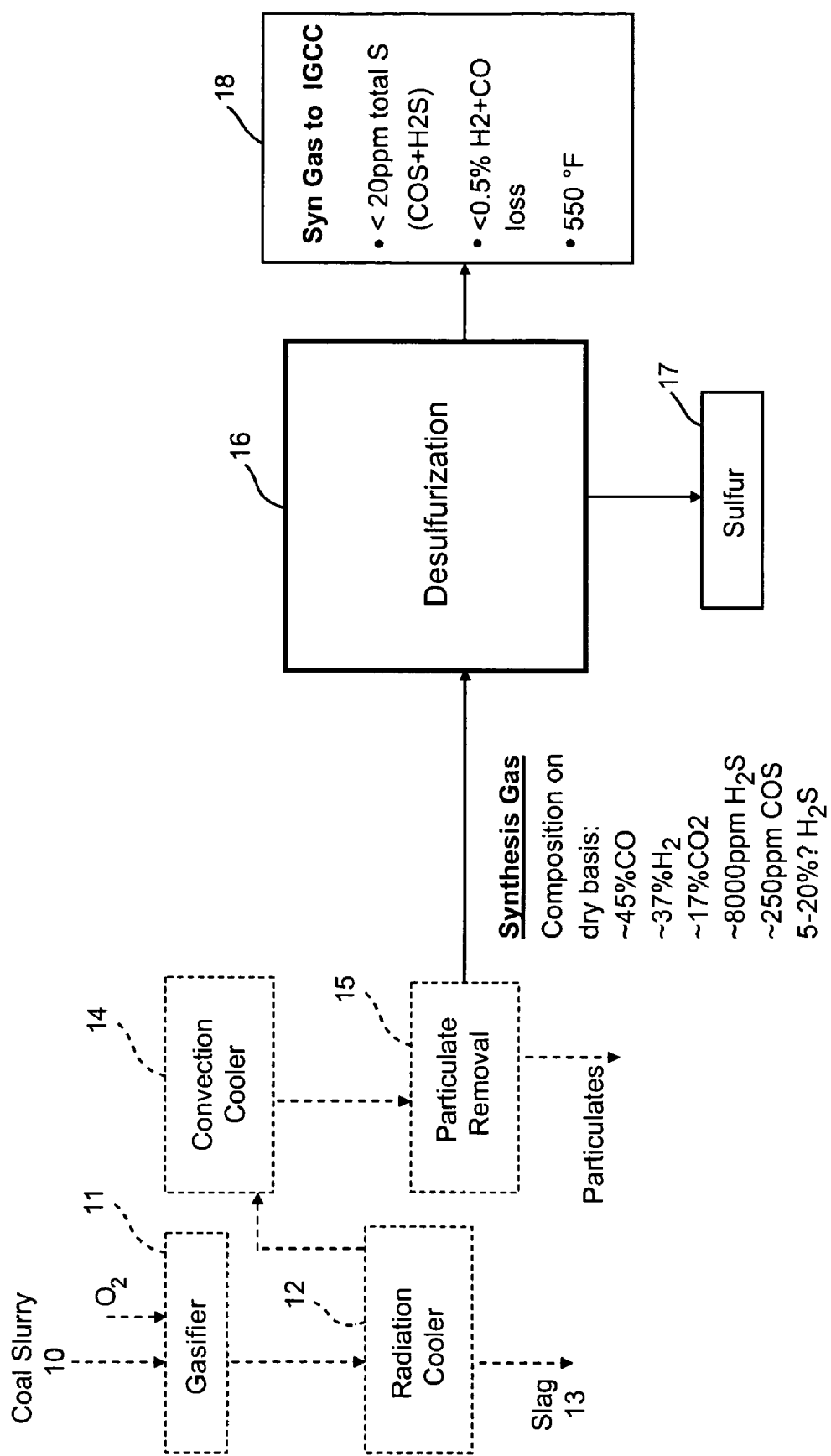
FIG. 1 is a simplified block flow diagram depicting the basic chemical process that results in an exemplary synthesis gas stream to be treated using the direct oxidation process described herein.

The present method for treating synthesis gas and/or gas streams containing hydrocarbon fuel components and unwanted sulfur compounds uses direct oxidation of hydrogen sulfide, with an appropriate catalyst to form elemental sulfur. Air, substantially pure oxygen or sulfur dioxide may serve as the oxidant. The oxidation reaction is selective for sulfur compounds and results in elemental sulfur that is removed from the synthesis gas stream. After a significant portion of the sulfur compounds have been converted to sulfur and removed from the synthesis gas in the direct oxidation unit, the synthesis gas is fed to a conventional acid gas removal unit, in which all or part or the carbon dioxide is thereby removed.

Because the acid gas removal units (amine or physical solvent) are more selective for sulfur compounds than carbon dioxide, any residual sulfur compounds will be removed with the carbon dioxide. The carbon dioxide, together with the unconverted sulfur compounds from the direct oxidation process, is recycled to the gasifier. The sulfur compounds will pass through the gasifier to be recycled to the direct oxidation unit. The carbon dioxide will participate in the gasification reactions, resulting in increased yield and/or changes in the distribution of the synthesis gas components.

In the past, the use of direct oxidation has not been utilized to remove sulfur-containing compounds from synthesis gas and produce elemental sulfur. To date, the use of this technique with less than complete conversion of the sulfur compounds with the recycle of the unconverted sulfur compounds has not been utilized. The process provides a far less complex and lower cost method for removing hydrogen sulfide in synthesis gas streams containing significant quantities of carbon dioxide. Although the use of direct oxidation to obtain sulfur in synthesis gas has been proposed in the past, heretofore those processes have not been used effectively with a recycle carbon dioxide stream in the manner described herein.

The direct oxidation process according to the invention contemplates the use of air, oxygen or even sulfur dioxide ($SO_2$) as potential oxidizing agents, with the oxygen present in either substantially pure or diluted form, in order to treat a synthesis gas stream containing both hydrogen sulfide and Carbon Dioxide ($CO_2$). As noted above, the direct oxidation may be catalytic or potentially non-catalytic in nature and oxidizes the hydrogen sulfide to sulfur according to the following general reactions:

$$H_2S + \tfrac{1}{2}O_2 \rightarrow S + H_2O; \qquad (1)$$

or $$H_2S + \tfrac{1}{2}SO_2 \rightarrow \tfrac{3}{2}S + H_2O. \qquad (2)$$

The direct oxidation of hydrogen sulfide in streams containing carbon dioxide can result in significant reductions in capital cost of the sulfur recovery systems, for example, by (1) eliminating the need for a conventional sulfur recovery unit, e.g., systems that utilize a Claus sulfur recovery process and associated process equipment; (2) eliminating the need for conventional tail gas treatment processes and associated processing equipment (such as solvent-based absorption columns); and (3) eliminating the need for conventional hydrolysis treatment facilities to remove COS. In exemplary embodiments of the invention, from about 50% by weight up to about 93% by weight of the hydrogen sulfide present in the synthesis gas feed can be converted to sulfur and water. The process also significantly simplifies and improves the performance of acid gas removal systems, such as those used in the petroleum, petrochemical and gas refining industries.

A substantial fraction of the hydrogen sulfide present in a synthesis gas stream and/or a waste recycle stream containing sulfur compounds can thus be converted to elemental sulfur and free hydrogen using direct oxidation. Often, the synthesis gas undergoing direct oxidation contains hydrogen sulfide, carbon monoxide, hydrogen, carbon dioxide and water. The hydrogen sulfide can be converted with a minimal loss of free hydrogen in the original synthesis gas feed and with minimal change in the initial carbon monoxide (CO) concentration.

An exemplary process according to the invention includes the steps of contacting a feed stream containing synthesis gas with oxygen, air, or sulfur dioxide in the presence of a catalyst, typically oxides of transition metals such as Ti or Nb, in order to convert a substantial fraction of the hydrogen sulfide present in the combined feed stream into elemental sulfur and water. The reaction is typically conducted at temperatures where the sulfur is below its dew point and will at least partially condense and be removed from the synthesis gas. Such relatively low temperatures are necessary to prevent the excessive oxidation of hydrogen and carbon monoxide. The relatively low operating temperature, however, results in incomplete conversion of the sulfur compounds in the synthesis gas. The effluent from the DO reactor is cooled to temperatures that are above the solidification point of sulfur with additional liquid sulfur condensation and removal.

The synthesis gas containing the sulfur compounds that were not removed in the DO reactor are further cooled and sent to an acid gas removal system (AGR). The AGR system may be any of a number of commercially available technologies based on chemical or physical solvents. In the AGR, carbon dioxide is removed for recycle to the gasifier. The carbon dioxide's recycle function is to increase conversion and or to change the distribution of components in the synthesis gas. Because the solvents used in the AGR are typically more selective for hydrogen sulfide and carbonyl sulfide than for carbon dioxide, the unconverted sulfur compounds will be removed from the synthesis gas along with the carbon dioxide. The sulfur compounds contained in the recycle carbon dioxide stream will then pass through the gasifier and be recycled to the direct oxidation unit where they will eventually be extinguished.

A high level conversion of hydrogen sulfide with controlled, i.e., minimal, reductions of free hydrogen and carbon monoxide, can be achieved using direct oxidation by adjusting one or more of the following process conditions: (1) the $H_2S$ feed temperature to the oxidation reactor; (2) the water content of the synthesis gas feed; (3) the specific catalyst used to convert the $H_2S$; and (4) the overall residence time of the $H_2S$ reaction.

Exemplary catalysts useful with the invention include, but are not limited to metal oxides transition metals such Ti and Nb and certain of the carbon-based formulations developed by the Department of Energy, as well as a number of pure metals and alloys. The catalysts used in the prior art Clause process for sulfur production, although known to be active in certain direct oxidation schemes (see, e.g., U.S. Pat. No.

6,099,819) to date have not proven to be effective for Syngas treatment applications in accordance with the invention.

One feature of the DOE process relates to the recycle of carbon dioxide reclaimed from the gasification process to the gasifier. Carbon dioxide can have several effects when added to a gasifier, including serving as a thermal quenching agent, or as an influence on the water gas shift reaction, or as a reaction component with carbonaceous materials. If, however, carbon dioxide is recycled to the gasifier according to the direct oxidation method described herein, the oxidation process does not need to be as efficient in order to be commercially valuable because any remaining unconverted hydrogen sulfide will still be recovered with the recycle carbon dioxide and not allowed to escape from the system.

Under certain process conditions, direct oxidation of hydrogen sulfide in the synthesis gas feed can also be achieved without using a catalyst. In yet a further embodiment, air (rather than substantially pure oxygen), or even sulfur dioxide can be added to the synthesis gas stream containing carbon dioxide and hydrogen sulfide in order to achieve the direct oxidation of $H_2S$. In addition, if necessary the final separation of any residual carbon dioxide and unreacted hydrogen sulfide may be accomplished after the oxidation steps are completed using known acid gas removal processes.

FIG. 1 of the drawings shows one exemplary process that results in a synthesis gas stream of the type to be treated using the direct oxidation process according to the invention. Typically, a coal slurry 10 is partially oxidized in a gasifier 11 as part of a power plant operation in order to produce high-pressure steam used to drive one or more steam turbine engines and generate electricity. The downstream gas products from the coal-fired furnace contain a substantial amount of carbon monoxide, as well as hydrogen, carbon dioxide, hydrogen sulfide, COS and water vapor.

The gas constituents are initially cooled using one or more conventional heat exchange units (shown by way of non-limiting example as radiation cooler 12) that significantly lower the gas temperature, allowing lower boiling components to condense and the removal of slag 13. The particulates 14 in the cooled gas stream are then removed as shown at step 15 (e.g., using one or more knock-out drums), resulting in a relatively particulate free synthesis gas stream capable of undergoing desulfurization. The gas stream is then cooled as shown at step 16 before undergoing desulfurization. A typical synthesis gas composition is shown adjacent to the feed to desulfurization step 17 in FIG. 1.

FIG. 1 at block 19 also shows the exemplary characteristics of synthesis gas products resulting from the direct oxidation process, i.e., with less than 20 ppm sulfur leaving the direct oxidation section in the form of COS and residual hydrogen sulfide, and with a combined loss of hydrogen and carbon monoxide during the oxidation of less than 5 wt %. Sulfur stream 18 (typically in molten form) is separated and removed as shown during the desulfurization step.

Figure 2:
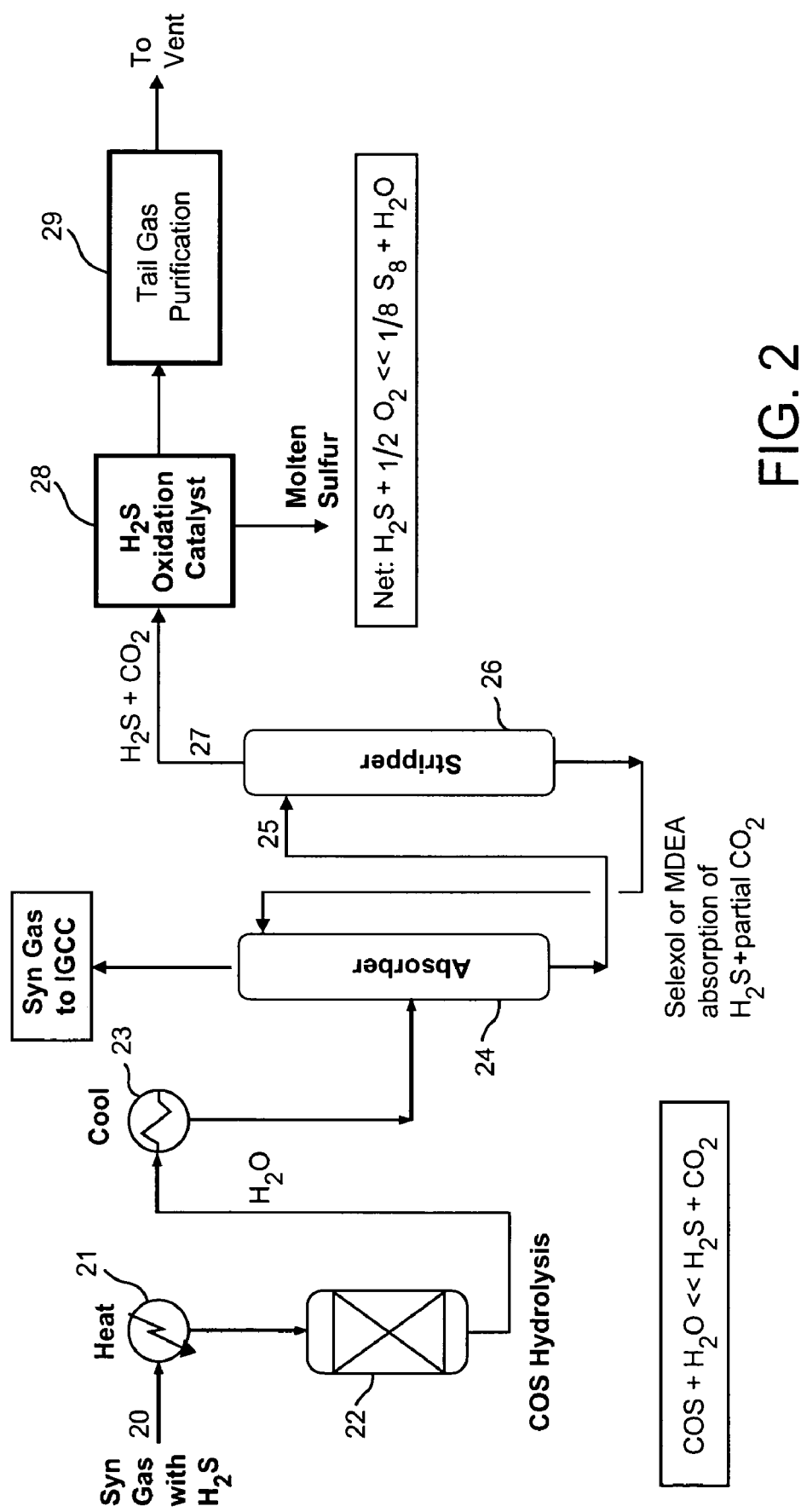
FIG. 2 is a process flow diagram showing a conventional prior art desulfurization process that does not utilize a direct oxidation process.

FIG. 2 of the drawings depicts a conventional. Prior art desulfurization process for a synthesis gas that contains hydrogen sulfide and carbon dioxide as key components. Typically, the synthesis gas feed 20 containing $H_2S$, CO and $CO_2$ is preheated in heat exchanger 21 and passed through a catalytic reactor 22 containing a hydrolysis catalyst. The reaction in catalytic reactor 22 converts a substantial fraction of the carbon dioxide and hydrogen sulfide to COS and water. The gaseous components of the reaction then pass through one or more intercoolers, normally with water as the cooling medium (shown generally as 23). The cooled gas components are then fed to an absorber (such as a packed or trayed column), typically using MDEA or a glycol ether as the solvent to absorb a significant portion of the $H_2S$ and $CO_2$ components, with the "clean" synthesis gas taken off the top of the absorber column (shown in FIG. 2 as "Syngas to IGCC").

Normally, the solvent tails from the absorber 25, which contain a substantial fraction of the $H_2S$ and $CO_2$, pass through a steam-stripping column that removes most of the $H_2S$ and $CO_2$ from the solvent medium. In the FIG. 2 process, the overhead gas stream from the stripper passes through a knock out drum 27 (with overhead $CO_2$ being recycled back to the COS hydrolysis unit). The liquid component from knock out drum 27 feeds directly into a second catalytic reactor 28 containing an oxidation catalyst that converts the hydrogen sulfide gas into elemental sulfur and water. Any remaining tail gases containing residual amounts of unoxidized $H_2S$, CO, $CO_2$ or other minor gas constituents are processed in purification plant 29 before any final waste stream is allowed to vent to the atmosphere. Together, the process steps occurring in second catalytic reactor 28 and purification plant 29 in FIG. 2 comprise a sulfur recovery unit ("SRU") as shown.

Figure 3:
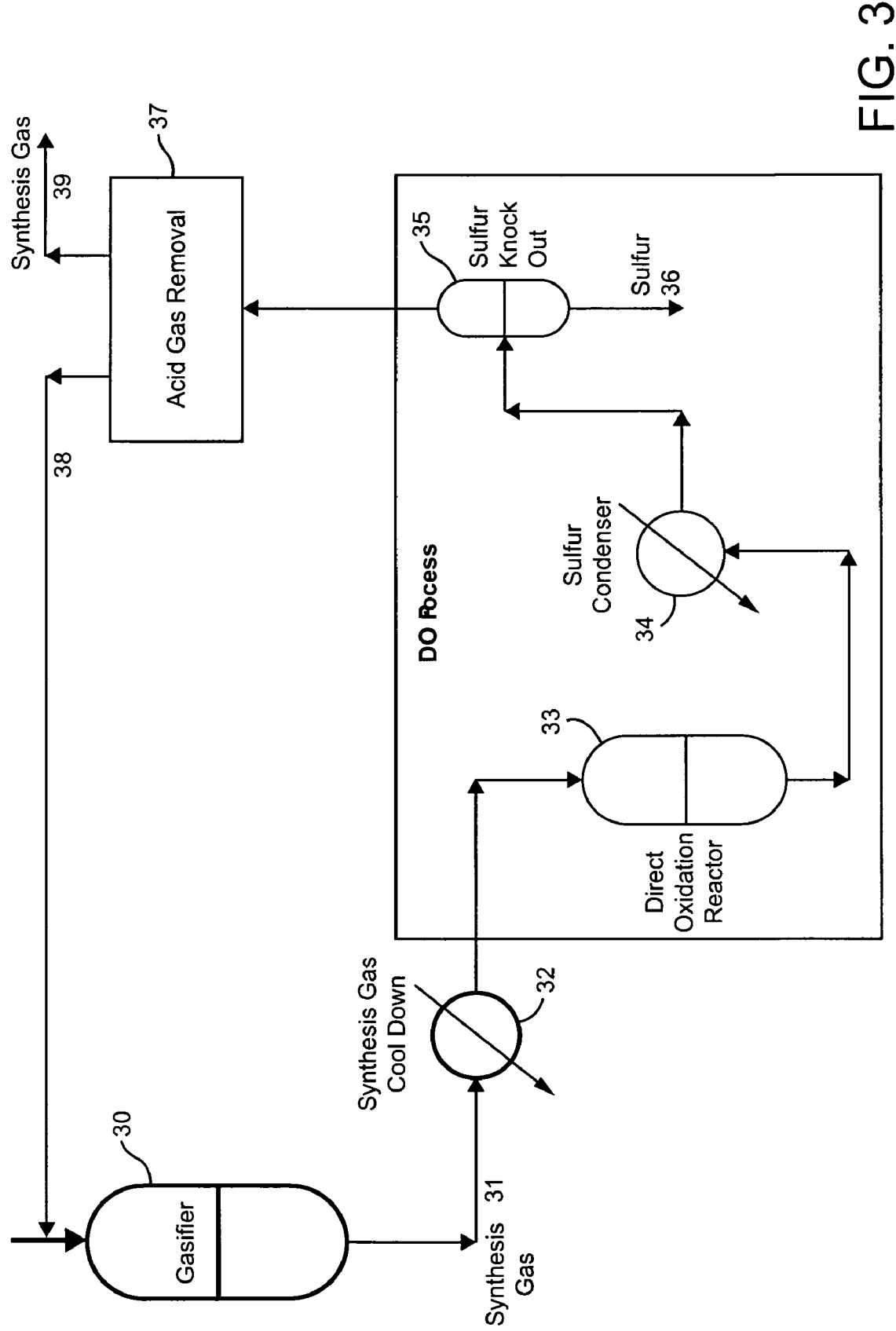
FIG. 3 is a simplified process flow diagram of an exemplary direct oxidation process according to the invention.

FIG. 3 of the drawings represents a simplified process flow diagram of an exemplary direct oxidation process according to the invention (shown in greater detail in FIG. 4) using substantially pure oxygen to accomplish the desired level of oxidation. As FIG. 3 illustrates, a portion of the carbon dioxide and hydrogen sulfide components that are not removed during the direct oxidation process are recycled back into the system as part of the initial feed to gasifier 30.

The synthesis gas leaving the gasifier is cooled in one or more heat exchangers in series before undergoing direct oxidation in catalytic reactor 33. The oxidized products of the reaction then pass through one or more sulfur condensers and downstream knock out drums (shown generally as 34 and 35). Raw sulfur product is removed, typically in molten form, at 36, with the remaining uncondensed vapor components (including any residual $CO_2$ and $H_2S$) being separated from the synthesis gas 39 in an acid gas removal plant 37, i.e., to effect $CO_2$ recovery, before being recycled as vapor stream 38 containing carbon dioxide and sulfur to gasifier 30.

Figure 4:
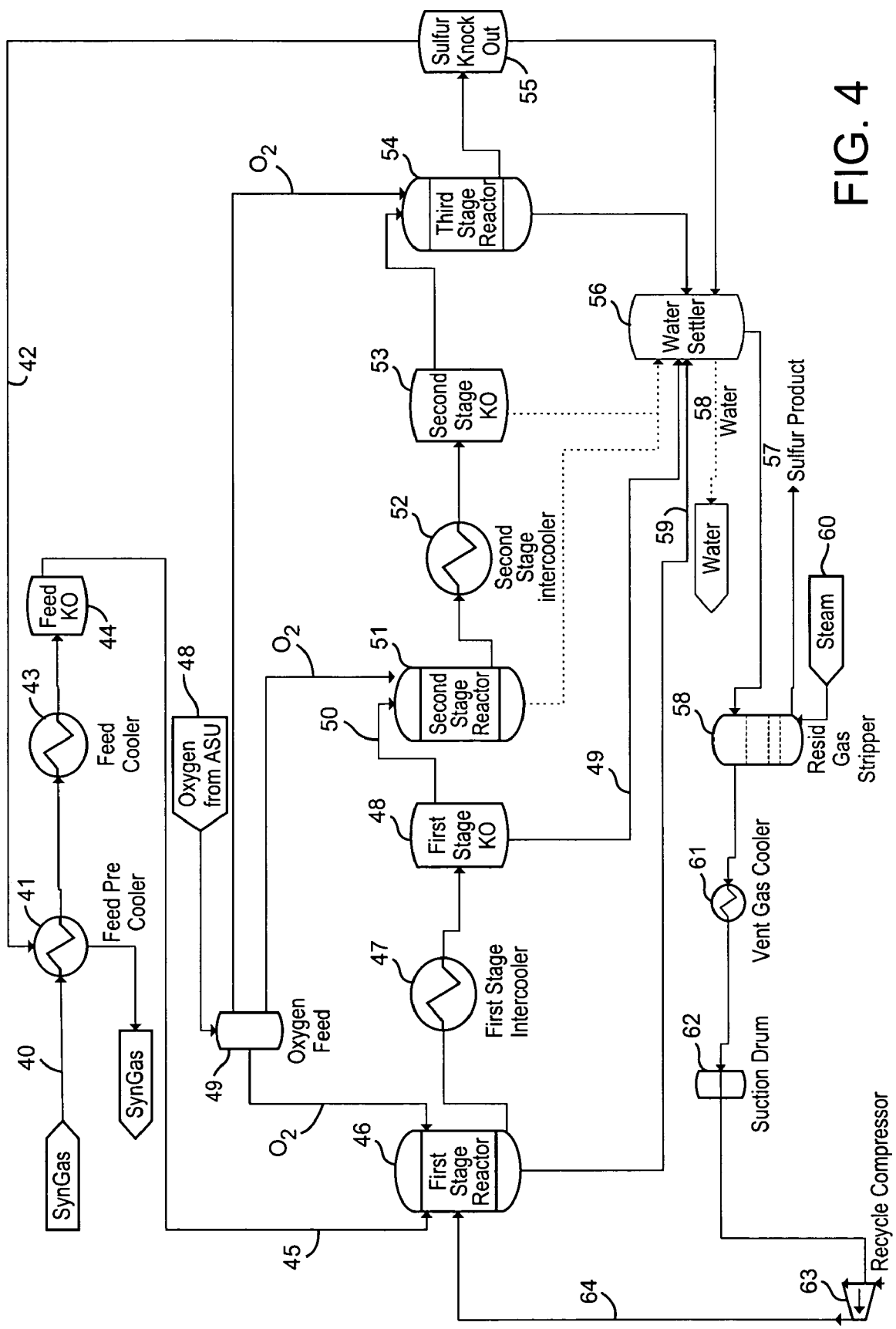
FIG. 4 is a more detailed process flow diagram of an exemplary direct oxidation process.

FIG. 4 of the drawings depicts a more detailed process flow diagram of an exemplary direct oxidation process showing the primary equipment components and process streams as described above in connection with FIG. 3. Synthesis gas stream 40 typically contains carbon monoxide, hydrogen, carbon dioxide and 5-50% water. SynGas feed 40 also typically contains, on a volume basis, about 0.5 to 1.0 percent hydrogen sulfide as well as significant quantities of COS. Before any direct oxidation takes place, feed 40 is cooled in pre-feed cooler 41 using recycle stream 42 serving as the cooling medium on one side of the cooler. Recycle stream 42 contains the synthesis gas product from the direct oxidation (with significantly reduced $H_2S$) resulting from the downstream gas separation steps described above. Recycle stream 42 also contains residual amounts of $CO_2$ and unreacted $H_2S$.

The cooled SynGas feed stream 42 passes through feed knock-out drum 44 which removes any entrained particulates and some condensed water. The substantially particulate-free stream from drum 44 is then fed into the first of a series of fixed bed, direct oxidation catalytic reactors having intervening intercoolers positioned between each of the different fixed bed reactors as shown. The feed to first stage reactor 46, which includes the cooled synthesis gas stream feed 45 and recycle stream 64 (containing $H_2S$ and CO), undergoes direct oxidation in the presence of a NB or Ti catalyst according the general equations described above. Substantially pure oxygen is fed to the reactor from oxygen feed tank 49 which splits the feed coming from an oxygen storage facility (labeled "ASU" 48) into three separate streams to thereby provide a separate oxygen feed to each of the fixed bed reactors in the direct oxidation process.

The reaction products from first stage reactor 46 (e.g., fixed bed type) include elemental sulfur, water and a reduced amount of unreacted SynGas, $H_2S$, $CO_2$ and CO. Most of the sulfur formed during the direct oxidation, as well as a portion of the water produced during the first stage reaction, are continuously removed from first stage reactor 46 via process line 59. The remaining products of the reaction, which include unreacted SynGas, $H_2S$ and carbon dioxide and carbon monoxide, pass through first stage intercooler 47 and into first stage knock out drum 48 which separates out additional amounts of sulfur and condensed water formed in the initial direct oxidation reaction. The remaining vapor components from knock out drum 48 are fed, together with substantially pure oxygen from oxygen feed tank 49, into second stage fixed bed catalyst reactor 51.

In the embodiment depicted in FIG. 4, the same direct oxidation catalyst can be used for all three fixed bed reactors. However, different oxidation catalysts could be used for the different reactors, depending on the specific operating conditions and reaction products created and/or desired during the various reactions. Regardless, additional amounts of sulfur and water are formed during each of the subsequent reactions. As FIG. 4 illustrates, the reaction products are removed from second stage reactor and fed, along with the bottoms from first stage reactor 46, to water settler 56 for further processing.

As in the first stage shown in FIG. 4, the remaining vapor components from the second stage direct oxidation (which include still unreacted $H_2S$ and SynGas) pass into downstream second stage intercooler 52 which in turn feeds the cooled vapor stream to second stage knock out drum 53. Like the first stage direct oxidation process steps described above, knock out drum 53 separates an additional amount of sulfur and water from the feed to drum 53, which in turn moves to common water settler 56. The remaining residual vapor stream (which includes even smaller amounts of unreacted SynGas, $H_2S$, CO and $CO_2$) then passes into third stage knock out drum 55.

As in the first two stages, drum 55 separates elemental sulfur and water from the final vapor constituents to be returned as recycle to pre-feed cooler 41. The additional sulfur and water from knock out drum 55 form part of the joint feed to water settler 56. Water settler 56 separates the combined elemental sulfur product formed during the various direct oxidation reactions in all three stages from the water formed during the same reactions (see process line 58). A final elemental sulfur product is obtained by steam stripping the product stream coming from the bottom of water settler 56 using steam stripper 58. Any remaining unreacted SynGas, CO2 and CO in the system then pass through vent gas cooler 61, suction drum 62 and recycle compressor 63 which increases the pressure of the recycle steam in an amount sufficient to allow the entire stream to be fed as recycle to first stage reactor 46.

The catalysts for the selective oxidation of hydrogen sulfide to sulfur and water frequently include oxides of Ti and Nb, either with or without added promoters from the nominal oxides of V, Cr, Mn, Fe, Co, Ni, Cu, Mo, and W. Other catalysts are also known, such as those based on carbon Co or Ni. It has been found that under certain reaction conditions, some or all of these oxide promoters may be converted to sulfides or sulfates (which are also active in the selective oxidation reaction). Exemplary catalysts include those described in U.S. Pat. No. 6,099,819, as well as other comparable catalysts capable of absorbing sulfur. The catalysts, when placed in a fixed bed or fluidized bed reactor in the presence of air, oxygen or sulfur dioxide, will selectively oxidize the hydrogen sulfide to sulfur, with the formation of small quantities of sulfur dioxide. The amount of air needed for the reaction is dictated by the reaction stoichiometry depicted in equation (1) above. As also noted above, the sulfur vapor in the reactor outlet can be recovered as molten or solid sulfur by condensing the sulfur in a down-stream heat exchanger.

Catalysts useful with the invention have been found to operate effectively even in the presence of certain so-called "impurities," such as carbon dioxide and water. The preferred catalysts operate at temperatures between about 100° C. and about 400° C., depending on the sulfur dew point of the product stream at the reactor outlet. Preferably, the reactor operates at a high enough temperature to avoid condensation of sulfur on the catalyst itself.

Figure 5:
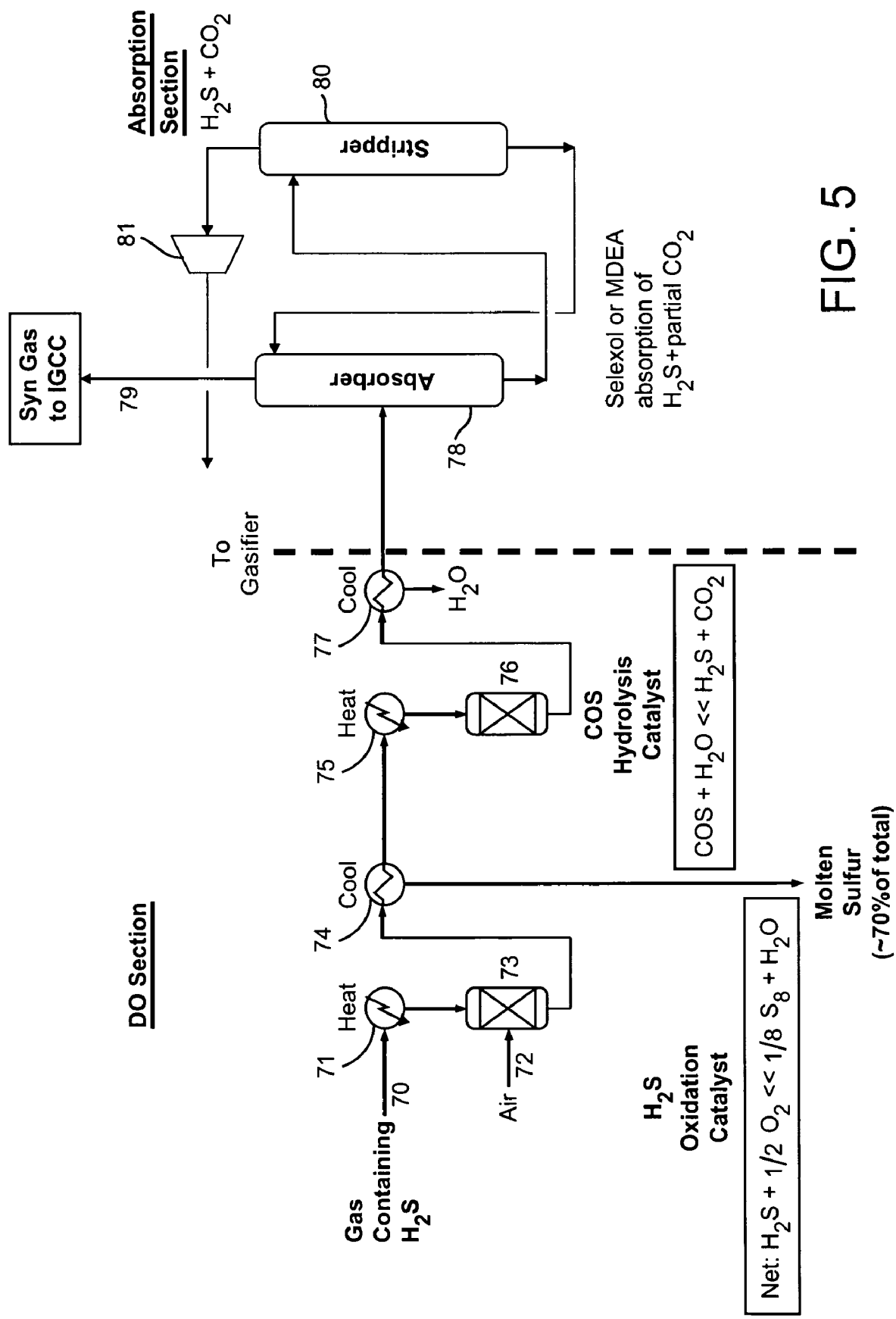
FIG. 5 is a process flow diagram of an alternative embodiment of a direct oxidation process using air rather than pure oxygen and depicts the basic process equipment necessary to remove elemental sulfur and the associated reaction sequences.

FIG. 5 of the drawings depicts an alternative embodiment that includes direct oxidation of the SynGas feed, but with additional downstream processing to remove hydrogen sulfide using COS hydrolysis. In the direct oxidation portion of the process, feed gas 70 containing $H_2S$ is preheated in heat exchanger 71 and then fed to direct oxidation reactor 73 along with air (rather than substantially pure oxygen) as shown at line 72. The resulting reaction products are then cooled in intercooler 74, with molten sulfur (approximately 70% of the total sulfur in the feed) being removed downstream of intercooler 74 as shown. The remaining vapor components, which include any remaining unreacted $H_2S$, SynGas, CO and $CO_2$, are treated in a separate catalytic reactor using a known COS hydrolysis catalyst as described above, with the resulting reaction products being primarily water and COS. The reaction products are cooled using water as the cooling medium in intercooler 77 and fed to absorber 78, which operates in series with stripper 80.

The absorption section of the process shown in FIG. 5 utilizes the same basic absorption/stripping process steps described above in connection with known $H_2S$ removal processes using one or more physical solvents or amines, e.g., MDEA or glycol ether, capable of absorbing $H_2S$ and partial $CO_2$. The resulting "clean" SynGas stream 79 is then fed to the IGCC as shown, and any residual unreacted $H_2S$ and $CO_2$ are returned as recycle to the feed gas 70 entering the gasifier.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for removing hydrogen sulfide to produce elemental sulfur and water from a synthesis gas feed stream containing hydrogen sulfide and carbon dioxide, said method comprising the steps of:

Contacting said synthesis gas feed stream with oxygen in the presence of a catalyst to convert a portion of said hydrogen sulfide through direct oxidation into elemental sulfur and water;

cooling initial reaction products to a temperature below the dew point temperature of the elemental sulfur;

separating said initial reaction products into a first stream containing elemental sulfur and water and second stream containing carbon dioxide and unreacted components remaining in said synthesis gas, and recycling a portion of said unreacted components and carbon dioxide to said synthesis gas feed stream.

2. A method according to claim 1, wherein said synthesis gas feed stream comprises one or more of hydrogen sulfide, carbon monoxide, hydrogen, carbon dioxide, water and carbonyl sulfide.

3. A method according to claim 1, wherein said second stream includes one or more of unreacted hydrogen sulfide, carbon monoxide, free hydrogen, carbon dioxide and water.

4. A method according to claim 1, further comprising the step of feeding air to said synthesis gas feed stream prior to contacting said feed stream with said catalyst.

5. A method according to claim 2, wherein said step of contacting said synthesis gas feed stream with oxygen in the presence of a catalyst forms elemental sulfur and water without reducing free hydrogen and carbon monoxide present in said initial feed stream.

6. A method according to claim 1, further comprising the step of simultaneously adding pure oxygen to said synthesis gas feed stream into a first reaction vessel during contact of said feed stream with said catalyst.

7. A method according to claim 1, wherein said catalyst is capable of directly oxidizing hydrogen sulfide to sulfur and water.

8. A method according to claim 1, wherein said catalyst comprises one or more carbon based catalysts.

9. A method according to claim 1, wherein said catalyst comprises Nb, Ti, Fe, Co or Ni.

10. A method according to claim 1, wherein said catalyst further comprises one or more catalyst promoters consisting essentially of the oxides of V, Cr, Mn, Fe, Co, Ni, Cu and Mo.

11. A method according to claim 1, wherein said step of contacting said synthesis gas feed stream with oxygen in the presence of a catalyst occurs at a temperature of about 300° F.

12. A method according to claim 1, wherein between about 50% to about 93% by weight of said hydrogen sulfide present in said synthesis gas feed is converted to sulfur and water.

13. A method according to claim 1, wherein said step of contacting said synthesis gas feed stream with oxygen does not occur in the presence of any catalyst.

* * * * *